(12) United States Patent
Schedivy

(10) Patent No.: US 8,243,215 B2
(45) Date of Patent: Aug. 14, 2012

(54) HOOD FOR VEHICLE SEAT HEADREST INCLUDING A VIDEO SYSTEM

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 1883 days.

(21) Appl. No.: 10/645,048

(22) Filed: Aug. 21, 2003

(65) Prior Publication Data

US 2004/0086259 A1    May 6, 2004

Related U.S. Application Data

(60) Provisional application No. 60/423,675, filed on Nov. 4, 2002.

(51) Int. Cl.
H04N 5/64      (2006.01)

(52) U.S. Cl. .......................................... 348/838; 348/837

(58) Field of Classification Search .......... 348/837–838; 725/75–77; 297/217.3
See application file for complete search history.

(56) References Cited

U.S. PATENT DOCUMENTS

| | | |
|---|---|---|
| 4,756,528 A | 7/1988 | Umashankar |
| 4,843,477 A | 6/1989 | Mizutani et al. |
| 5,507,556 A * | 4/1996 | Dixon .......................... 297/217.3 |
| 5,555,466 A | 9/1996 | Scribner et al. |
| 5,949,345 A | 9/1999 | Beckert et al. |
| D438,853 S | 3/2001 | Iino |
| 6,216,927 B1 * | 4/2001 | Meritt ............................ 224/275 |
| 6,409,242 B1 | 6/2002 | Chang |
| 6,512,670 B1 * | 1/2003 | Boehme et al. ............... 361/681 |
| 6,556,435 B1 * | 4/2003 | Helot et al. .................... 361/686 |
| 6,724,317 B1 * | 4/2004 | Kitano et al. .............. 340/691.1 |
| 6,865,075 B2 * | 3/2005 | Oakley .......................... 361/683 |
| 6,899,365 B2 * | 5/2005 | Lavelle et al. ............. 296/37.15 |
| 6,928,654 B2 * | 8/2005 | Tranchina et al. ............. 725/75 |
| D515,051 S * | 2/2006 | Peng ........................... D14/129 |
| 2002/0149708 A1 * | 10/2002 | Nagata et al. ................. 348/837 |
| 2003/0137584 A1 | 7/2003 | Norvell et al. |
| 2003/0226148 A1 * | 12/2003 | Ferguson ........................ 725/75 |
| 2004/0017652 A1 * | 1/2004 | Billington et al. ............ 361/686 |
| 2004/0189881 A1 * | 9/2004 | Cook et al. .................... 348/837 |
| 2004/0212745 A1 * | 10/2004 | Chang .......................... 348/837 |
| 2006/0061145 A1 * | 3/2006 | Strebe et al. .................. 296/214 |
| 2006/0109388 A1 * | 5/2006 | Sanders et al. ............... 348/837 |

FOREIGN PATENT DOCUMENTS

| | | |
|---|---|---|
| FR | 2 829 980 | 3/2003 |
| WO | WO 03/029050 A1 | 4/2003 |

\* cited by examiner

*Primary Examiner* — Brian Yenke
(74) *Attorney, Agent, or Firm* — F. Chau & Associates, LLC

(57) ABSTRACT

A video system comprises a hood sized for fitting over a vehicle seat headrest, wherein the hood includes a display and a media player, a base portion attached to the hood, and a door pivotally attached to the base portion, wherein the display is mounted to the door and the media player is mounted to the door or mounted in the base portion.

26 Claims, 22 Drawing Sheets

HOOD FOR VEHICLE SEAT HEADREST INCLUDING A VIDEO SYSTEM

REFERENCES TO RELATED APPLICATIONS

This application claims the benefit of Provisional Application Serial No. 60/423,675, filed on Nov. 4, 2002, the contents of which are herein incorporated by reference.

BACKGROUND OF THE INVENTION

1. Field of the Invention

The present invention relates to a video system, and more particularly to a video system formed in a hood capable of fitting over a vehicle seat headrest.

2. Discussion of Related Art

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens may be connected to video players, such as a video cassette player (VCP) or a digital video disk (DVD) player located, for example, in the glove box of the vehicle. However, the video player and video screen cannot be removed from the vehicle or transferred to another vehicle. Thus, videos may only be viewed with such systems when occupying a specific vehicle. Further, there is also a risk of theft of the video screen and video player and corresponding damage to the vehicle when the vehicle is left unattended.

Therefore, a need exists for a video system that is removable from a vehicle and can be transferred from one vehicle to another with relative ease.

SUMMARY OF THE INVENTION

A video system, according to an embodiment of the present invention, includes a hood sized for fitting over a vehicle seat headrest, wherein the hood includes a display connectable to a media player.

In alternate embodiments, the video system may include a frame for mounting the display, wherein the frame is attached to the hood, and the media player may be located in the hood. The video system may further include a base portion attached to the hood, and a door pivotally attached to the base portion, wherein the display and the media player are mounted to the door. The media player may be one of a slot-type and a clamshell-type device.

The video system may include a docking station attached to the hood, a base portion selectively coupled to the docking station, wherein the base portion can be selectively decoupled from the docking station, and a door pivotally attached to the base portion, wherein the display and the media player are mounted to the door. The video system may also include a wireless transmitter having one of an optical transmitting device and an antenna, wherein the wireless transmitter transmits wireless signals on more than one channel. The video system may further include a cover for covering the display, a port for connecting to an external device, at least one controller for controlling functions of the display, and a drawstring on the hood for tightening the hood to the vehicle seat headrest. The display may be connected to a power source of the vehicle.

Another video system, according to an embodiment of the present invention, includes a hood sized for fitting over a vehicle seat headrest, wherein the hood includes a display and a media player, a base portion attached to the hood, and a door pivotally attached to the base portion, wherein the display is mounted to the door and the media player is one of mounted to the door and mounted in the base portion.

In alternate embodiments, the media player may be one of a slot-type and a clamshell-type device. The video system may include a wireless transmitter having one of an optical transmitting device and an antenna, wherein the wireless transmitter transmits wireless signals on more than one channel. The video system may further include a cover for covering the display, a port for connecting to an external device, at least one controller for controlling functions of the display, and at least one controller for controlling functions of the media player. The display and the media player may be connected to a power source of the vehicle. The hood may include a drawstring for tightening the hood to the vehicle seat headrest. The display may be mounted on a front side of the door and the media player may be mounted on a backside of the door. The display may be coupled to the media player through an opening in the door. The door may pivot in a range of angles including approximately 0° to 180° with respect to the base portion, and may consist of an open center section bordered by a frame, wherein the display and media player are positioned in the open center section.

A hood for fitting over a vehicle seat headrest, in accordance with the present invention, includes a docking station for receiving and securing a video system, wherein the docking station includes means for securing the video system to the docking station, and means for providing power to a secured video system.

In alternate embodiments, the video system may include a base portion attachable to the docking station and an external power supply for use when the base portion is detached from the docking station. The means for providing power to the secured video system may include at least one pin array. The pin array may carry one of an audio and a video signal from the secured video system to an external device. The hood may include a drawstring for tightening the hood to the vehicle seat headrest and the docking station may be connected to a power source of the vehicle.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

According to an embodiment of the present invention, a video system can be integrated into a hood that fits over vehicle seat headrest. The hood including the video system is removable and can be transferred from one vehicle to another vehicle.

Figure 1:
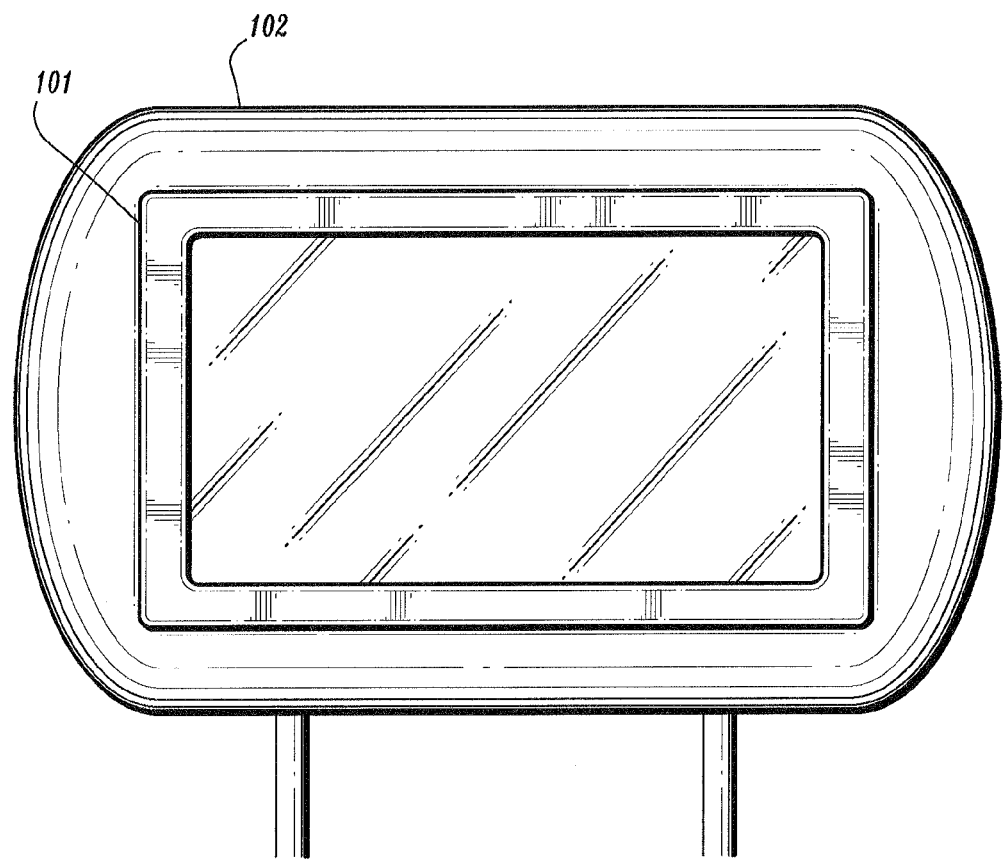
FIG. 1 is an illustration of a video screen installed in a vehicle headrest.
Figure 2:
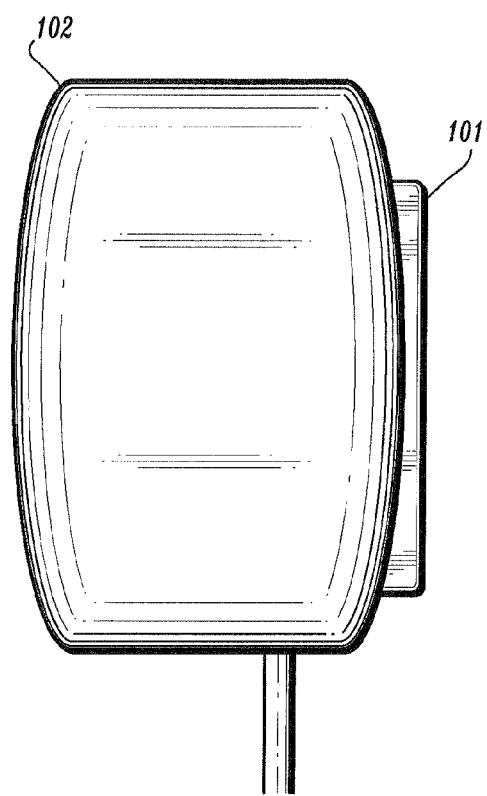
FIG. 2 is an illustration of a video screen installed in a vehicle headrest.
Figure 3:
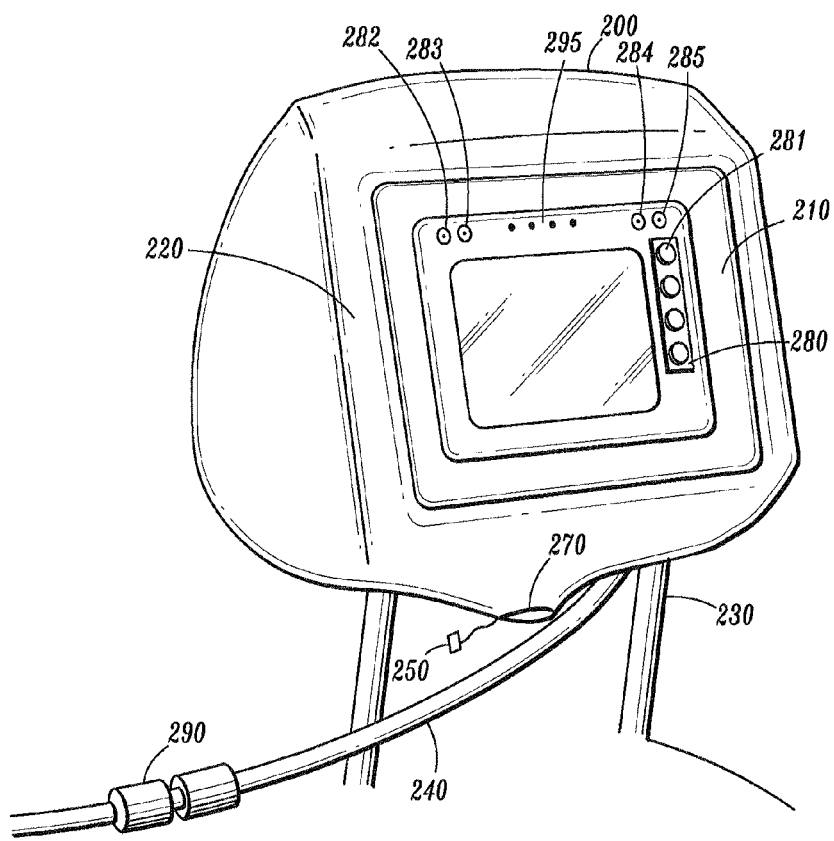
FIG. 3 shows a hood including a display according to an embodiment of the present invention.

Referring to FIG. 3, a hood 200 having a display 220 is shown. The hood 200 is dimensioned and configured substantially like a headrest (shown sitting on a headrest frame 230) of a vehicle seat for convenient installation within a vehicle by slipping the hood 200 over the headrest. A drawstring 250 can be used to draw close the opening 270 after the hood 200 is placed on the headrest. Elastic can be used in place of the drawstring 250 to close the opening 270. The hood 200 is preferably made from a flexible material such as cloth or leather.

The display 220 is mounted in a display frame 210, which in turn is attached to the hood 200. The frame 210 may consist of an outer frame (not shown) that can be closed into an inner frame (not shown), wherein the frame 210 is attached to the hood 200 by closing the outer frame into the inner frame with the hood 200 sandwiched in between the outer and inner frames. Alternatively, the frame 210 can be glued or epoxied onto the hood 200.

The display 220 fits snuggly into the frame 210. The display 220 has a thin display screen, preferably an LCD type screen, for displaying video information. A control panel 280 on the display 220 includes control buttons 281 for controlling the on screen display characteristics.

The display 220 may include input and output ports. For example, audio/video input/output ports 282, a headphone port 283, a power port 284 and an IR port 285 for transmitting and/or receiving, for example, remote control signals. It should be understood that other port types can be provided, for example, a USB port or RCA jack for connecting to a game controller or headphones. The ports can be positioned at any convenient location on the display 220, for example, on a bottom portion, a top portion, or a side portion of the display 220.

A speaker (not shown) also can be mounted in the hood 200, or to the frame 210 or display 220, for presenting audio information in connection with a video program being played. Alternatively, audio may be provided to vehicle occupants through the existing vehicle audio system.

To provide for audio reception through wireless headphones, the display 220 may include a wireless transmitter 295 for transmitting wireless signals to wireless receivers in wireless headphones. The wireless signals may include radio frequency signals for use with, for example, Bluetooth® wireless systems or infrared (IR) signals for use with, for example, Whitefire® systems. It is preferred that the wireless transmitter 295 has the capability to transmit wireless signals over more than one channel operating at a different frequency for each channel. The use of more than one channel, for example, avoids interference between more than one wireless headphone user watching different programs on different displays. Wireless signals also may be encoded to prevent interference between wireless headphones. Such encoding may be based on, for example, spread spectrum technology.

Figure 4:
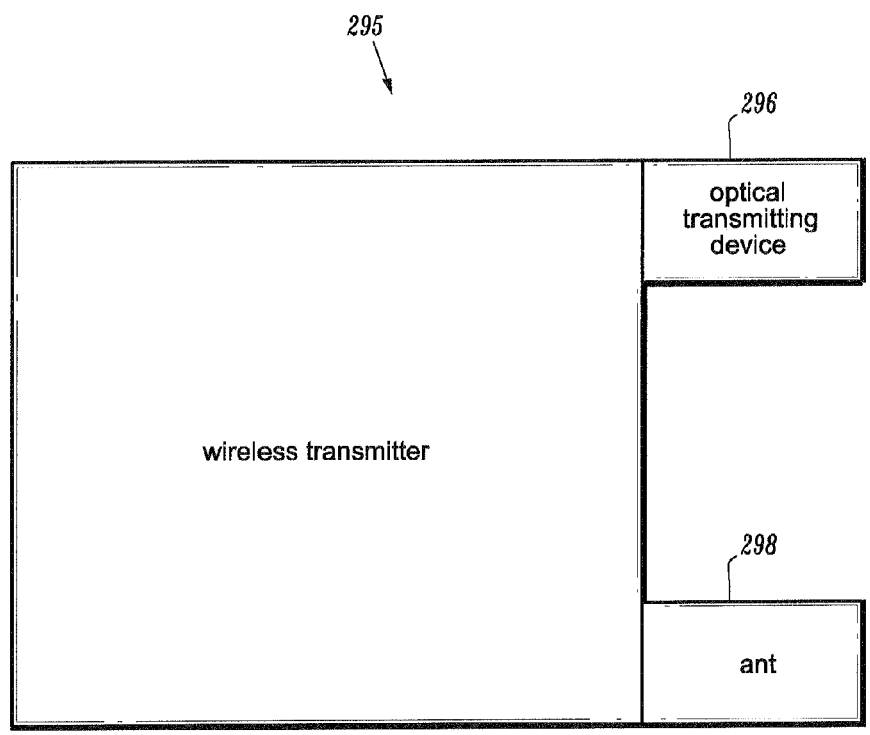
FIG. 4 shows a wireless transmitter according to an embodiment of the present invention.

As shown in FIG. 4, the wireless transmitter 295 includes an optical transmitting device 296 (e.g., an LED, a laser, and so forth) and an antenna 298. The optical transmitting device 296 and the antenna 298 may be used for wireless transmission of IR signals and RF signals, respectively.

Referring back to FIG. 3, at least one cable 240 is attached to the display 220 and is extended from the inside of the hood 200. A connector 290 connects to an entertainment device (not shown) such as a DVD player, VCP, TV tuner, or game console. Cable 240 can run down the seat back and the entertainment unit can be placed under the seat. The cable 240 preferably includes conductors for receiving video, audio, and power, and may also lead to external devices such as a slave video display unit or a vehicle sound system.

Figure 5:
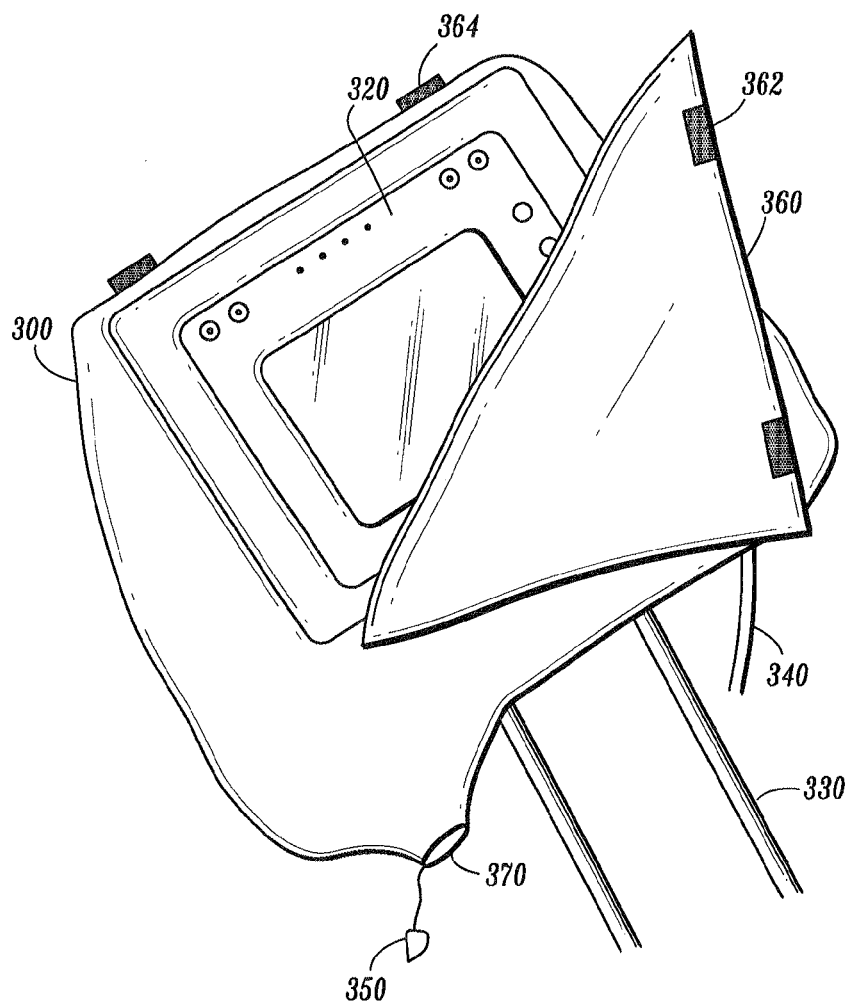
FIG. 5 shows a hood with a display according to an embodiment of the present invention.

FIG. 5 shows another embodiment of a hood 300 having a display 320. Hood 300 is slipped over a headrest attached to headrest frame 330. String 350 closes an opening 370 in the hood 300 around the bottom of the headrest. Display 320 is mounted on display frame 310, which is attached to hood 300 in a similar manner as explained for the hood 200 of FIG. 3. A flap 360 is attached to a lower portion of the hood 300. The flap 360 is used to cover the display 320 when it is not in use. Velcro members 362 and 364 are used to couple the flap 360 in its closed position. The flap 360 can also be closed by a zipper (not shown). Like the hood 200 shown in FIG. 3, a cable 340 is attached to the display 320 and is extended from the inside of the hood 300 for connecting to a separate entertainment device and receiving power from the vehicle.

Figure 6A:
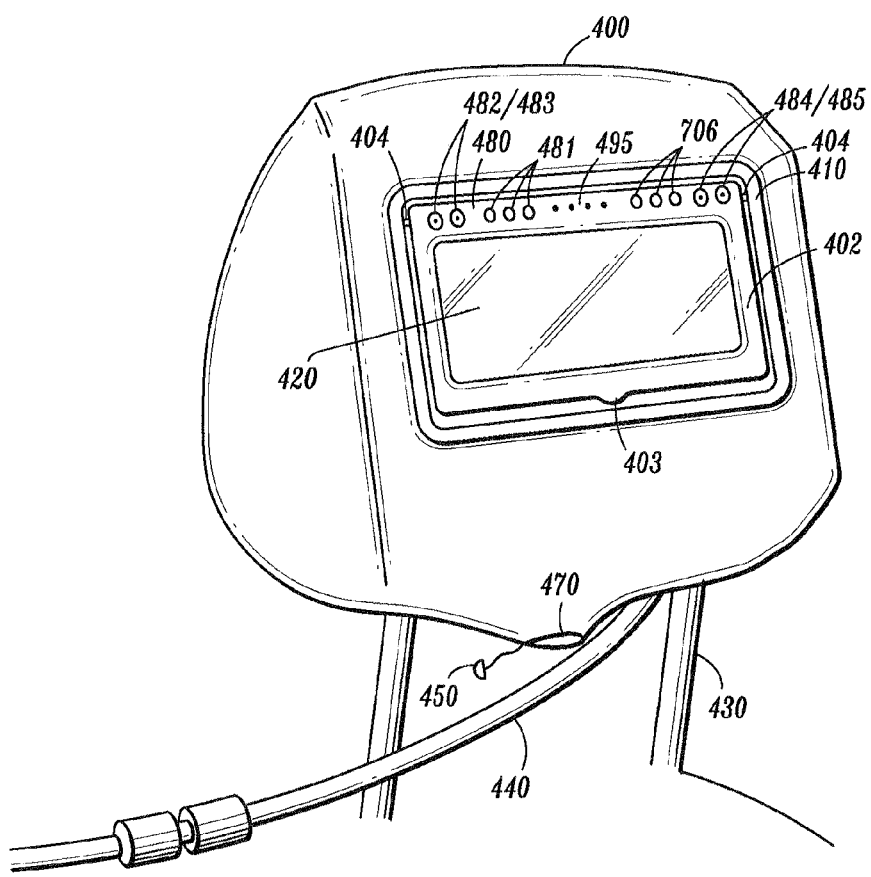
FIGS. 6A-6C show a hood including a display and an entertainment device according to an embodiment of the present invention.
Figure 6B:
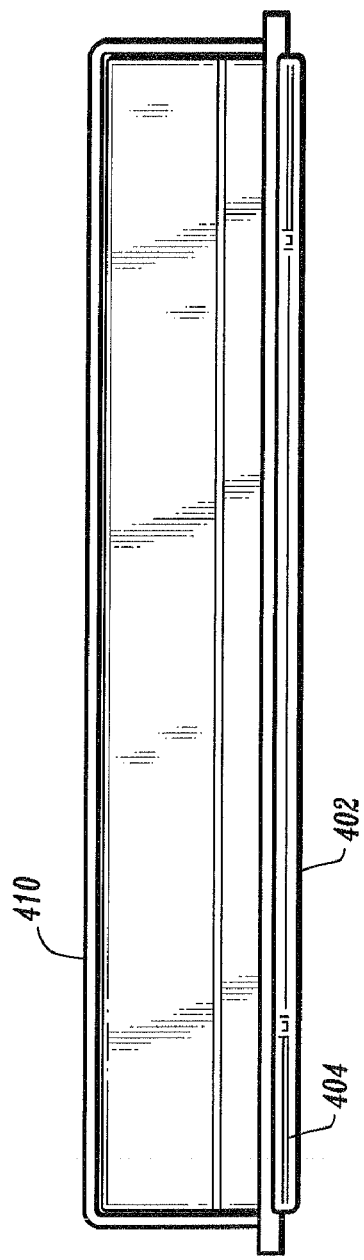
Figure 6C:
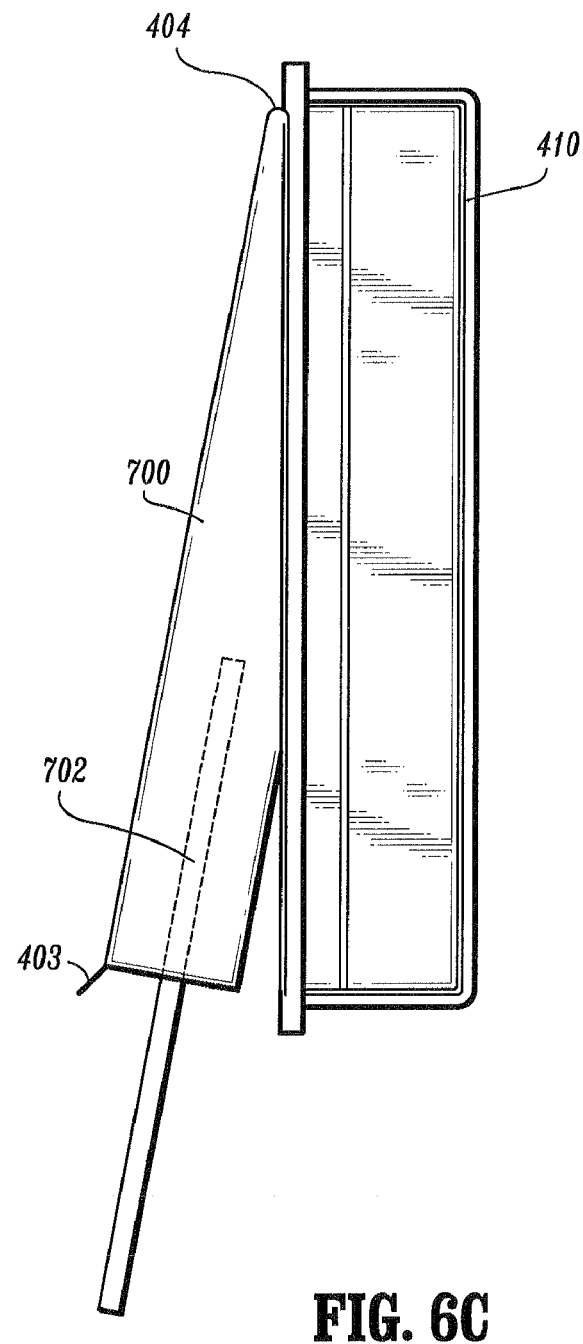
Figure 7A:
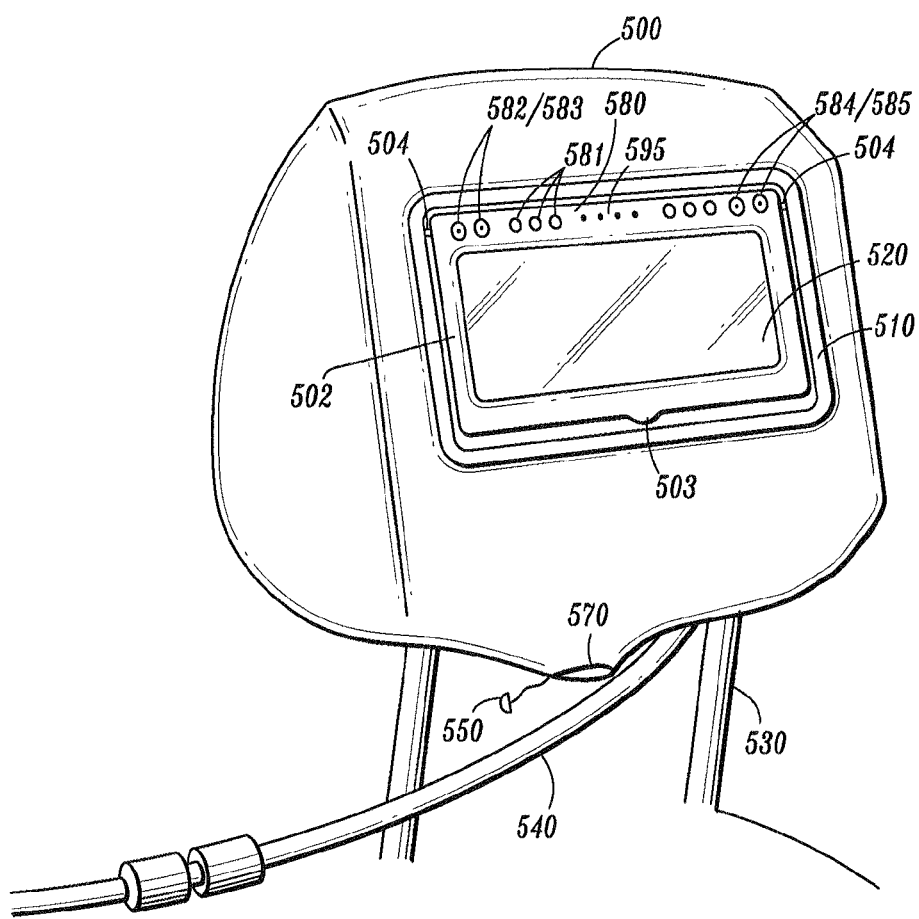
FIGS. 7A-7E show a hood including a display and an entertainment device according to an embodiment of the present invention.
Figure 7B:
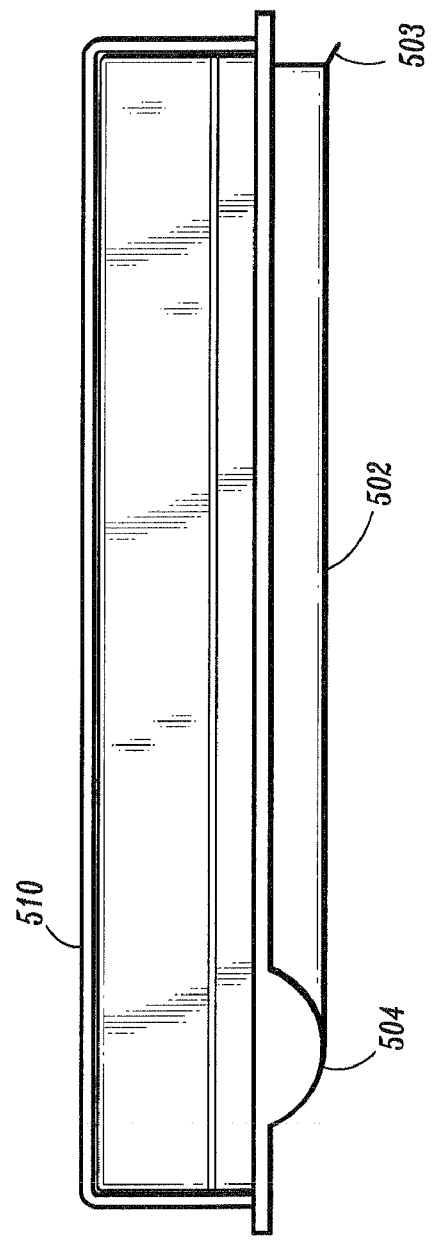
Figure 7C:
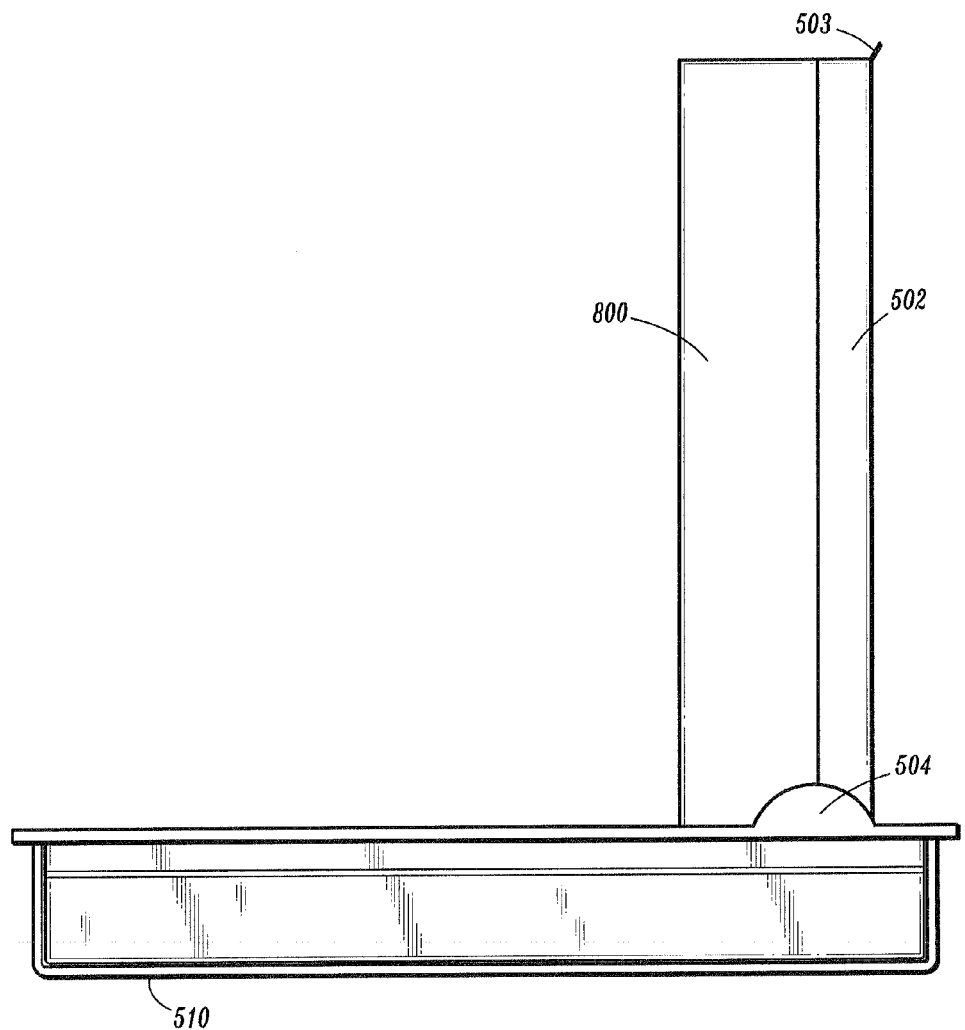
Figure 7D:
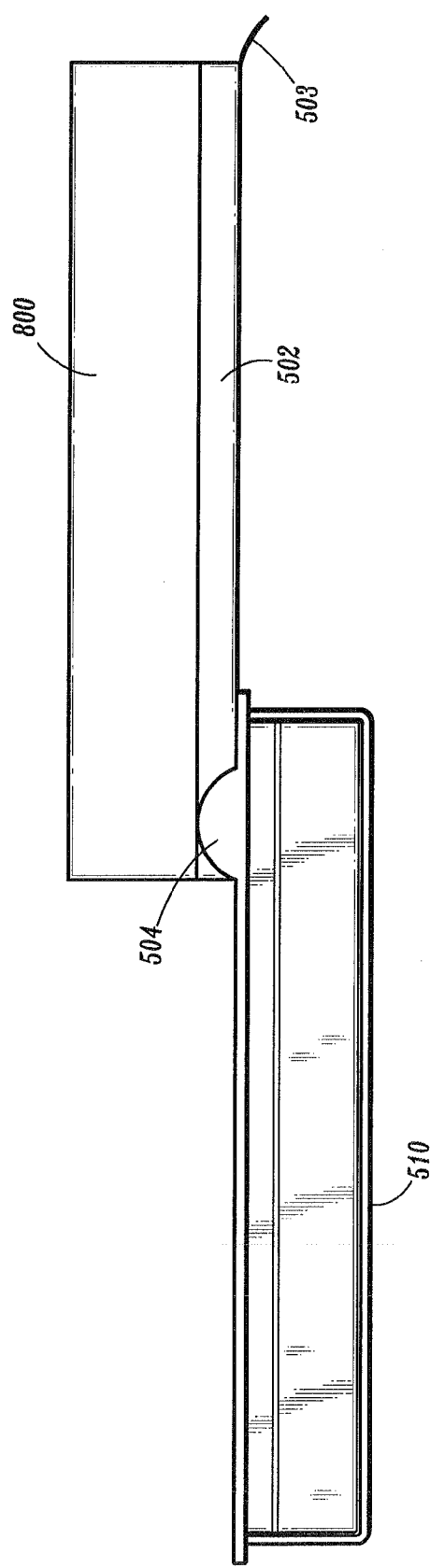
Figure 7E:
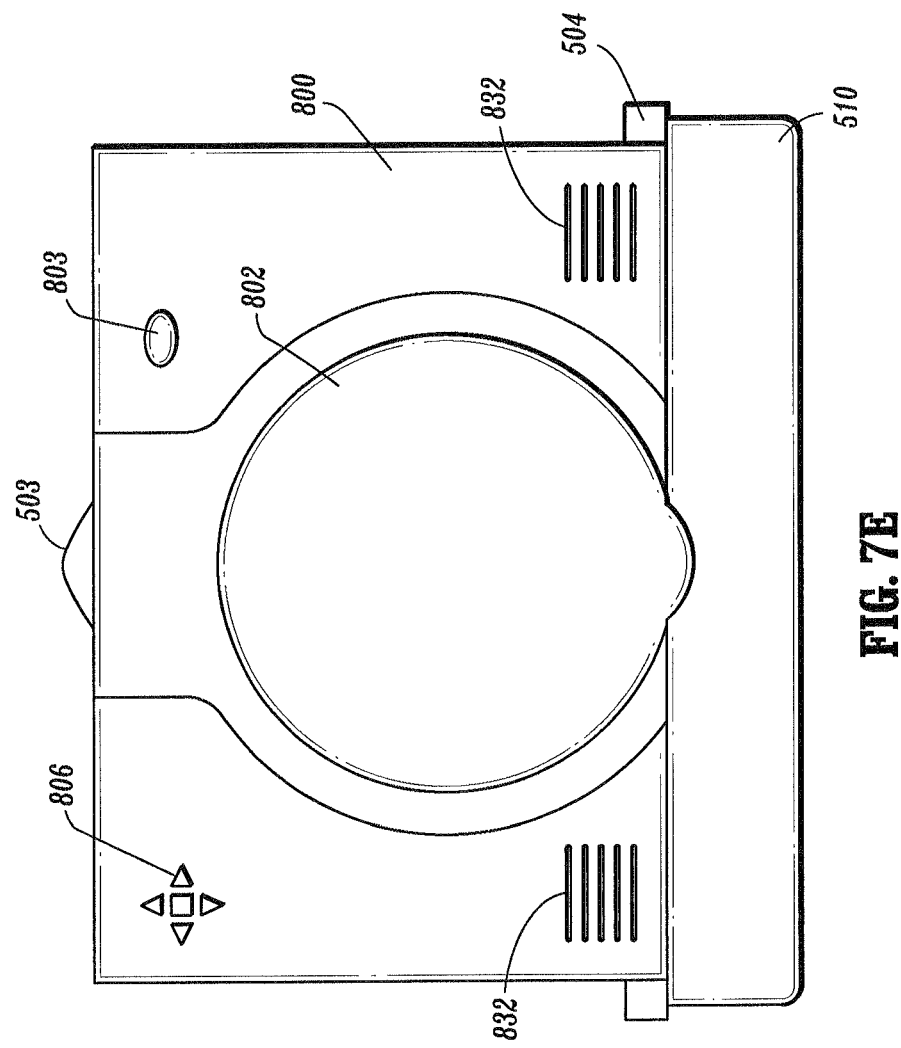

FIGS. 6A-6C show another embodiment of a hood 400, wherein an entertainment device 700, such as a DVD player, MPEG player 3 (MP3) or video game player, is integrated into the hood 400 along with the display 420. The hood 400 is similar to the hoods 200, 300, including a drawstring 450 (or elastic) for drawing close an opening 470 after the hood 400 is placed on a headrest. A flap used to cover the display 420, like the flap 360 shown in FIG. 5, may be attached to a portion of the hood 400 and Velcro members or a zipper may be used to close the flap.

As shown in FIGS. 6A-6C, a door 402 is connected via a hinge or hinges 404 to the base portion 410. The door 402 includes the display 420 and the entertainment unit 700 formed on opposites sides thereof. A connection between the display 420 and the entertainment unit 700 may be achieved through appropriately positioned openings in the door 402. Alternatively, the door 402 may consist of an open center section surrounded by a frame, wherein the display 420, including the entertainment unit 700 coupled to its rear, snugly fits into the open center section bordered by the frame. The display 420 and the entertainment unit 700 can be fixed to the door 402 by, for example, screws, catches, adhesives, molding, pressure fitting and/or any other means known to those skilled in the art. Similarly, the base portion 410 can be fixed to the hood 400 by, for example, screws, catches, adhesives, epoxies and/or any other means known to those skilled in the art.

The hinge 404, located at a top portion of the door 402, allows the door 402 to pivot away from the base portion 410 to expose a slot 702 in the entertainment device 700 for receiving a data media, such as a DVD. The hinge 404 may be positioned at top, side or bottom portions of the door 402, and depending on the location of the hinge 404, the slot 702 may be positioned at top, side or bottom portions of the entertainment device 700. The door 402 may be opened, for example, by pulling a tab 403 and/or by depressing a button (not shown) releasing the door 402 from the base portion 410.

Like the displays 220, 320 of the previously described embodiments, the display 420 has a thin display screen, preferably an LCD type screen, for displaying video information. A control panel 480 on the display 420 includes control buttons 481 for controlling the on screen display characteristics.

Like the wireless transmitter 295 and the input/output ports 282-285 described above, a wireless transmitter 495 and input/output ports 482-485 may be positioned at any convenient location on the door 402, the display 420 or base portion 410.

Further, a speaker (not shown) can be mounted in the hood 400 or in the entertainment unit 700, or to the door 402, base portion 410 or display 420, for presenting audio information in connection with a video program being played. Also, audio may be provided to vehicle occupants through the existing vehicle audio system. The hood 400 may also include a cable 440 connected to the video system therein that is capable of connecting to a vehicle's power supply and to external devices, such as, for example, a slave video display or a vehicle sound system.

Controls 706 for controlling functions of the entertainment device 700, such as, volume, previous, next, pause, eject, play and power on/off may be positioned on the hood 400, door 402, display 420, and/or the entertainment device 700. The controls 706 can be, for example, buttons, switches, a touch sensitive liquid crystal display and the like.

FIGS. 7A-7E show another embodiment of a hood 500, wherein an entertainment device 800, such as a DVD player, MP3 or video game player, is integrated into the hood 500 along with the display 520. The hood 500 is similar to the hoods 200-400, including a drawstring 550 (or elastic) for drawing close an opening 570 and may include a flap, like the flap 360 shown in FIG. 5, to cover the display 520.

As shown in FIGS. 7A-7E, a door 502 is connected via a hinge or hinges 504 to the base portion 510. The door 502 includes the display 520 and the entertainment unit 800 formed on opposites sides thereof, like the door 402 and the entertainment unit 700 of the previously described embodiment. The display 520 and the entertainment unit 800 can be fixed to the door 502 and the base portion 510 can be fixed to the hood 500 by the same or similar means to those previously described in connection with the hood 400.

The hinge 504, located at a top portion of the door 502, allows the door 502 to pivot 180° away from the base portion 510 to expose a cover 802 of a clamshell-type entertainment device 800 that can be opened to allow insertion of a data media, such as a DVD, into the entertainment device 800. A hinge 504 that allows the door 502 to pivot more or less than 180° can be used provided that easy opening of the cover 802 and subsequent insertion or removal of a data media from the entertainment unit 800 can be achieved. The hinge 504 may be positioned at top, side or bottom portions of the door 502. The door 502 may be opened, for example, by pulling a tab 503. A button (not shown) may be depressed releasing the door 502 from the base portion 510. The cover 802 may be opened, for example, by pulling a tab (not shown) and/or by depressing a button 803 releasing the cover 802 from the entertainment unit 800.

Like the displays 220-420 of the previously described embodiments, the display 520 has a thin display screen, preferably an LCD type screen, and may include a control panel 580 with control buttons 581 for controlling the on screen display characteristics.

Like the wireless transmitter 295 and the input/output ports 282-285 described above, a wireless transmitter 595 and input/output ports 582-585 may be positioned at any convenient location on the door 502, the display 520 or the base portion 510. Also, audio may be provided to vehicle occupants through the existing vehicle audio system or through a speaker mounted in the hood 500 or entertainment unit 800, or to the door 502, base portion 510 or display 520. For example, speakers 832 are shown mounted in the entertainment unit 800. Like the cable 440 described above, the hood 500 also may include a cable 540 for connecting to a vehicle's power supply and to external devices.

Further, like the controls 706, controls 806 for controlling functions of the entertainment device 800, may be positioned on the hood 500, door 502, display 520, and/or the entertainment device 800.

FIGS. 8A-8D show another embodiment of a hood 600, wherein an entertainment device 900, such as a DVD player, MP3 or video game player, is integrated into the hood 600 along with the display 620. The hood 600 is similar to the hoods 200-500, including a drawstring 650 (or elastic) for drawing close an opening 670 and may include a flap, like the flap 360 shown in FIG. 5, to cover the display 620.

As shown in FIGS. 8A-8D, a door 602 is connected via a hinge or hinges 604 to the base portion 610. The door 602 includes the display 620 formed on a front side thereof. The display 620 can be fixed to the door 602 by, for example, screws, catches, adhesives, molding, pressure fitting, snugly fitting into an open center section of the door 602 bordered by a frame and/or any other means known to those skilled in the art. The base portion 610 can be fixed to the hood 600 by the same or similar means to those previously described in connection with other embodiments.

The hinge 604, located at a top portion of the door 602, allows the door 602 to pivot away from the base portion 610 to expose a clamshell-type entertainment device 900 positioned in the base portion 610. The entertainment device 900 can be fixed to the base portion 610 by any acceptable means known to those skilled in the art, such as by screws, catches, adhesives, molding and pressure fitting. The entertainment device 900 includes a cover 902 that can be opened to allow insertion of a data media, such as a DVD, into the entertainment device 900. The hinge 604 may be positioned at top, side or bottom portions of the door 602. The door 602 may be opened, for example, by pulling a tab 603. A button (not shown) may be depressed releasing the door 602 from the base portion 610. The cover 902 may be opened, for example, by pulling a tab (not shown) and/or by depressing a button 903 releasing the cover 902 from the entertainment unit 900.

Like the displays 220-520 of the previously described embodiments, the display 620 has a thin display screen, preferably an LCD type screen, and may include a control panel 680 with control buttons 681 for controlling the on screen display characteristics.

Like the wireless transmitter 295 and the input/output ports 282-285 described above, a wireless transmitter 695 and input/output ports 682-685 may be positioned at any convenient location on the door 602, the display 620 or the base portion 610. Also, audio may be provided to vehicle occupants through the existing vehicle audio system or through a speaker mounted in the hood 600 or entertainment unit 900, or to the door 602, base portion 610 or display 620. Like the cable 440 described above, the hood 600 also may include a cable 640 for connecting to a vehicle's power supply and to external devices.

Figure 8A:
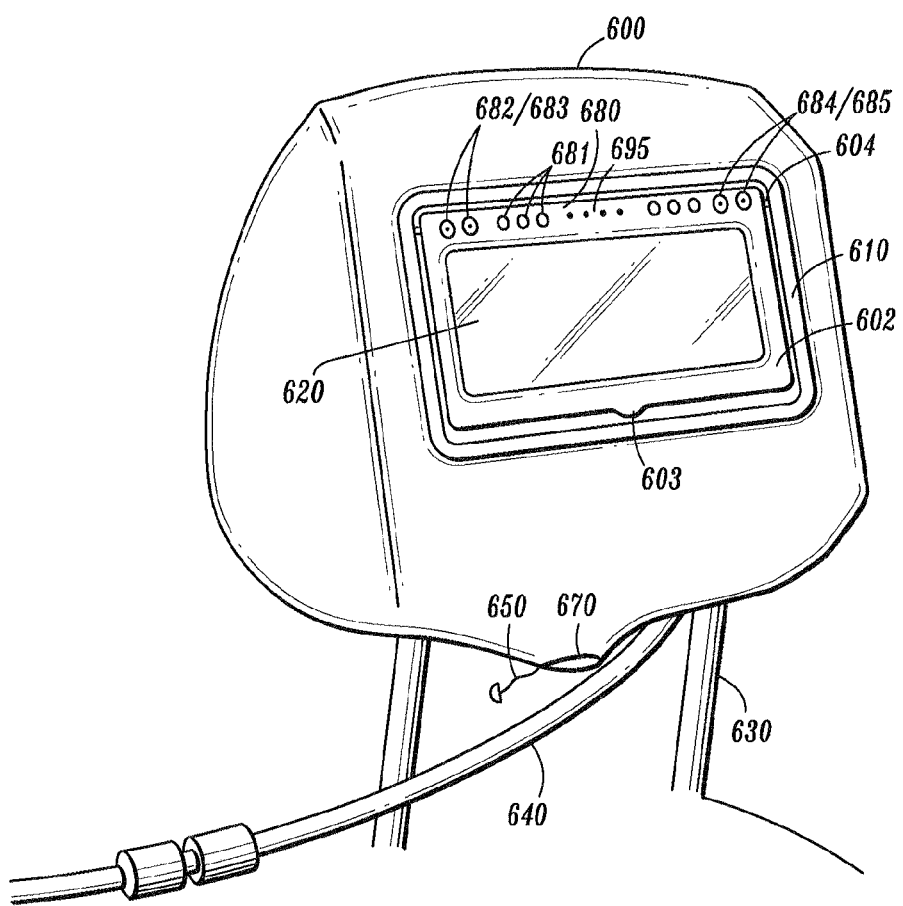
FIGS. 8A-8D show a hood including a display and an entertainment device according to an embodiment of the present invention.
Figure 8B:
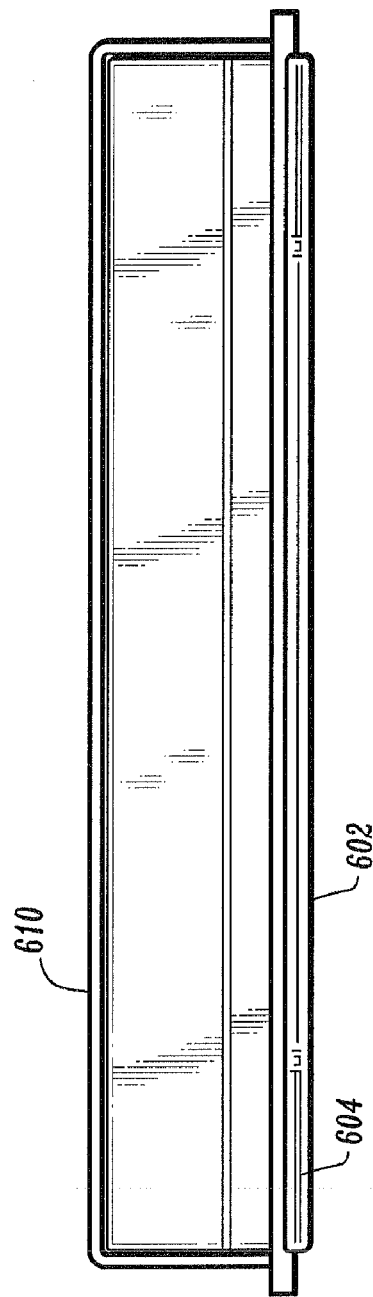
Figure 8C:
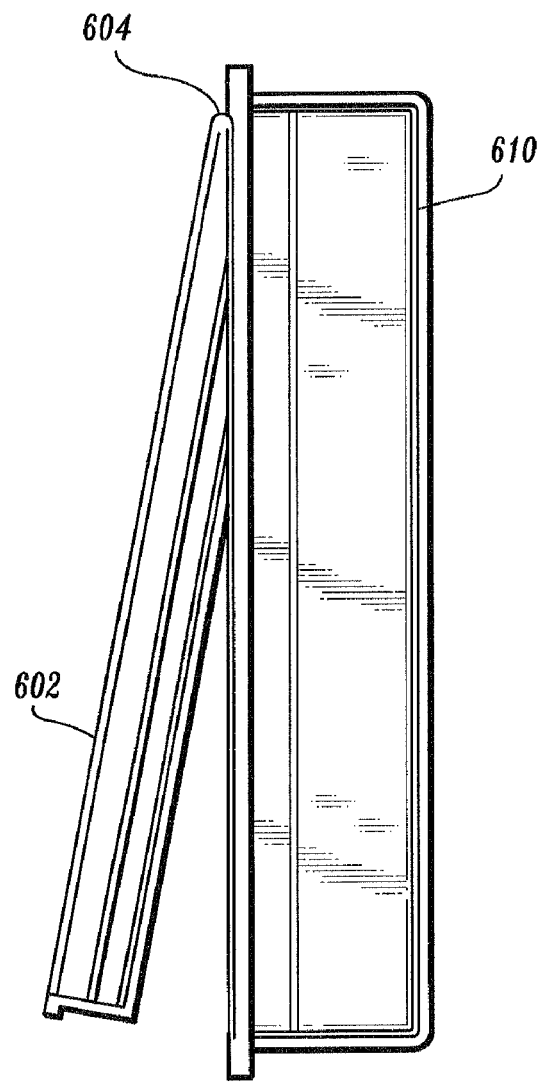
Figure 8D:
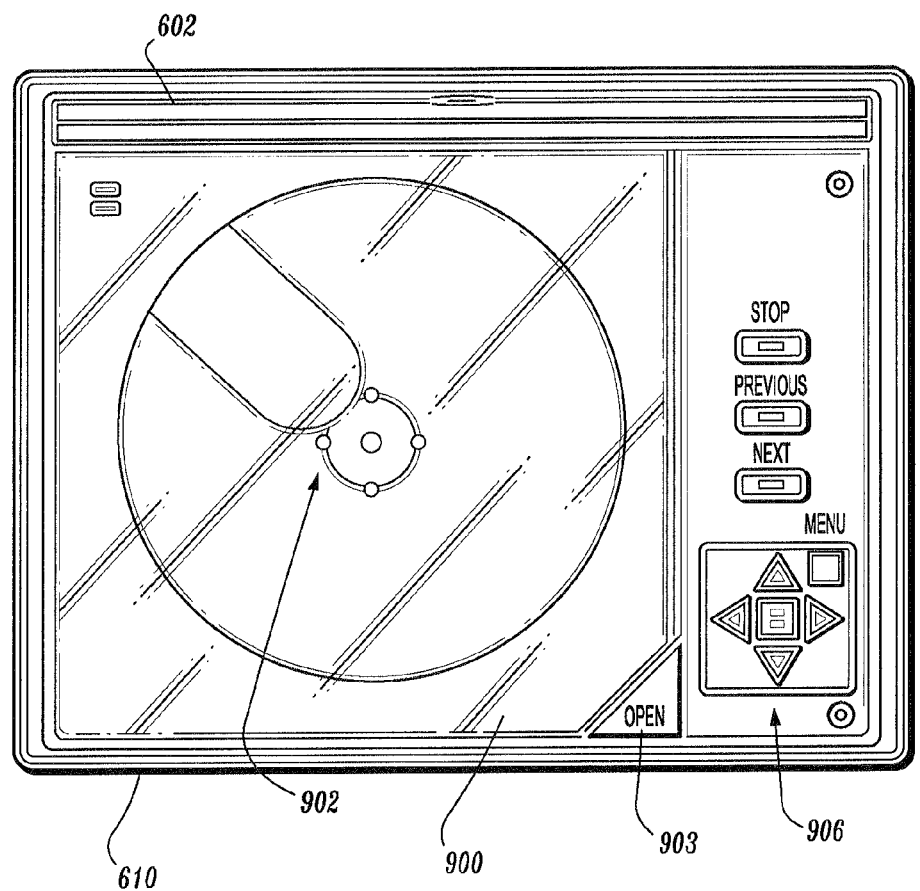

Further, like the controls 706, controls 906 for controlling functions of the entertainment device 900, may be positioned on the hood 600, door 602, display 620, and/or the entertainment device 900. For example, controls 906 are shown in FIG. 8D positioned on the entertainment device 900.

Figure 9:
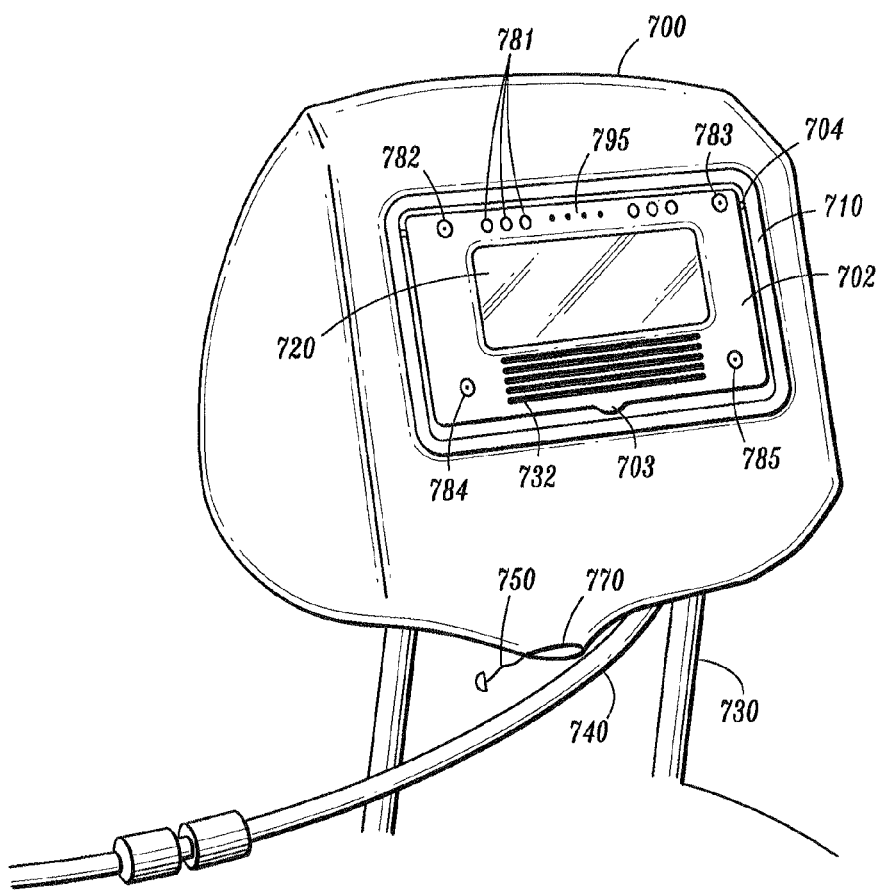
FIG. 9 shows a hood including a display and an entertainment device according to an embodiment of the present invention.

Referring to FIG. 9, another embodiment of a hood 700, wherein an entertainment device, such as a DVD player, MP3 or video game player, is integrated into the hood 700 along with the display 720 is shown. The embodiment shown in FIG. 9 is the same as the embodiment shown in FIGS. 6, 7 or 8, except that the display 720 is smaller than the displays 420-620, allowing more options for positioning components, such as the input/output ports 782-784 and a speaker 732, on the door 702.

Figure 10A:
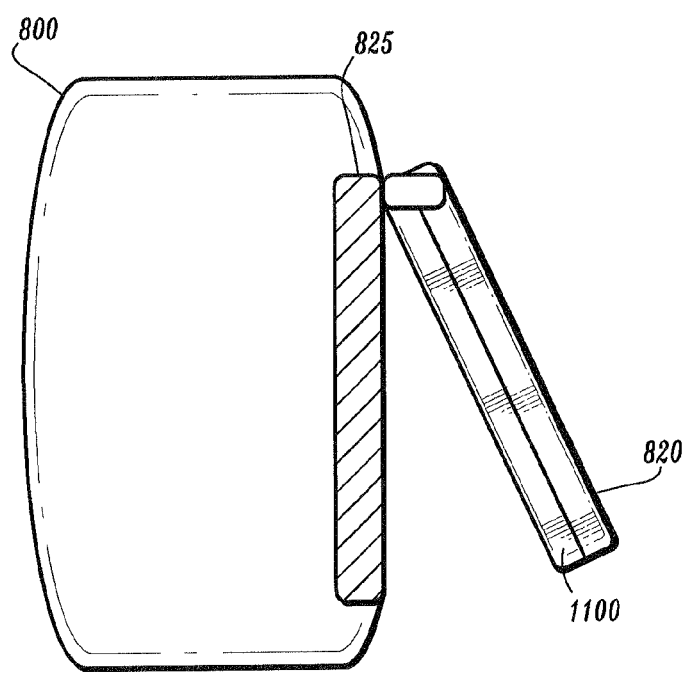
FIGS. 10A-10B show a hood including a docking station according to an embodiment of the present invention.
Figure 10B:
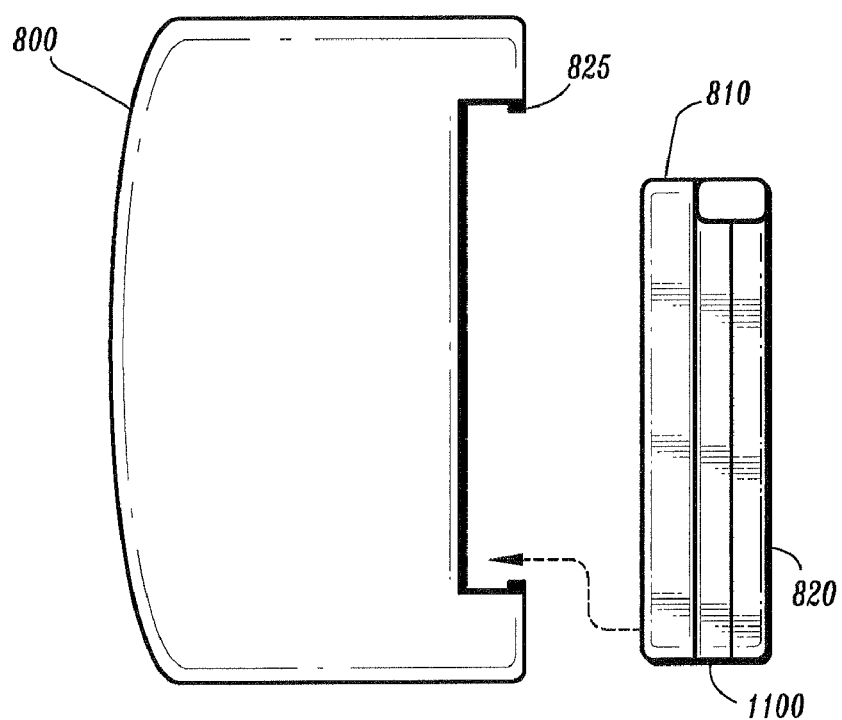

FIGS. 10A-10B show a hood 800 including a docking station 825 capable of securing a base portion of an entertainment device combined with a display, for example, the base portions 410-710 of the embodiments including a combination of an entertainment device and a display. The docking station 825 may be secured to the hood 800 by, for example, screws, catches, adhesives, epoxies and/or any other means known to those skilled in the art.

As shown in FIGS. 10A-10B, a video system including a display 820 and an entertainment device 1100 can be attached and detached from the docking station 825. Further, the video system, when decoupled from the docking station 825, can operate autonomously on power supplied by an optional battery or a connection to an external power supply, such as AC or DC current. The battery or power supply connection can be to the base portion 810 of the video system.

Figure 11A:
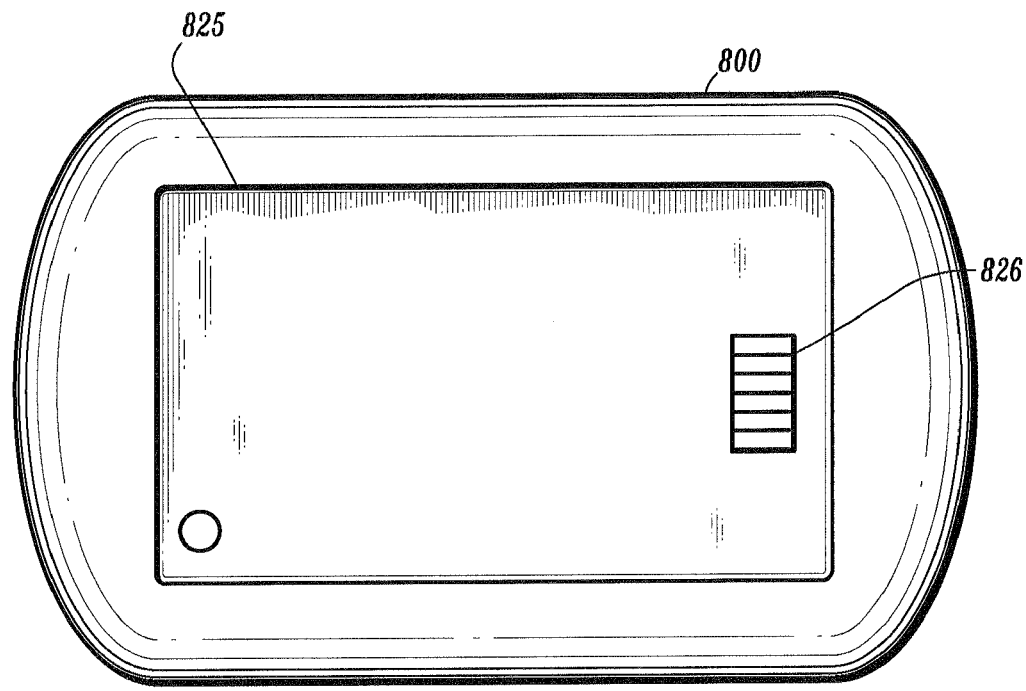
FIGS. 11A-11B show a docking station according to an embodiment of the present invention.
Figure 11B:
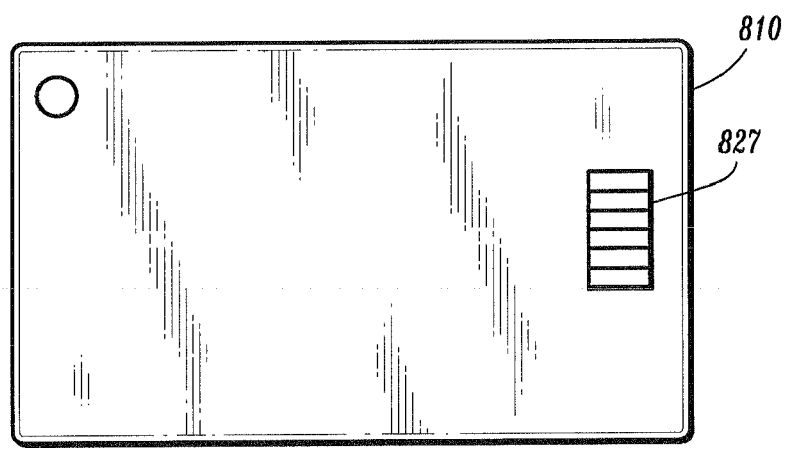

Referring to FIGS. 11A-11B, the docking station 825 includes a pin array 826 for connecting to a pin array 827 of the video system. The video system may be any combination of display and entertainment device, including slot or clamshell-type entertainment devices and large or small displays. In addition, other devices, such as video game units, may be secured to the docking station 825. When the video system is secured to the docking station 825, the pin array 826 and the video system pin array 827 transfer data to and from the entertainment device 1100 and/or display 820. Thus, the video system can be connected to external devices through the docking station 825. The external devices may include a slave video display or a vehicle sound system. Like the cable 440 described above, the hood 800 also may include a cable 840 for connecting to the external devices and to a vehicle's power supply. Power may be supplied to the video system through the pin arrays 826, 827.

Figure 12A:
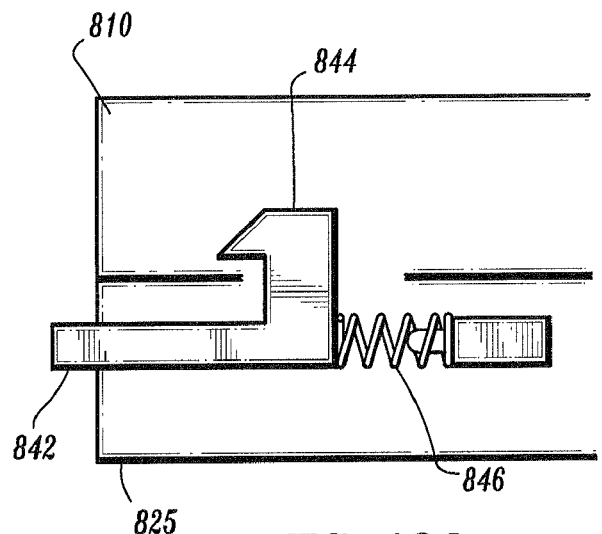
FIGS. 12A-12B show mechanisms for securing and releasing a video system to and from a docking station according to embodiments of the present invention.
Figure 12B:
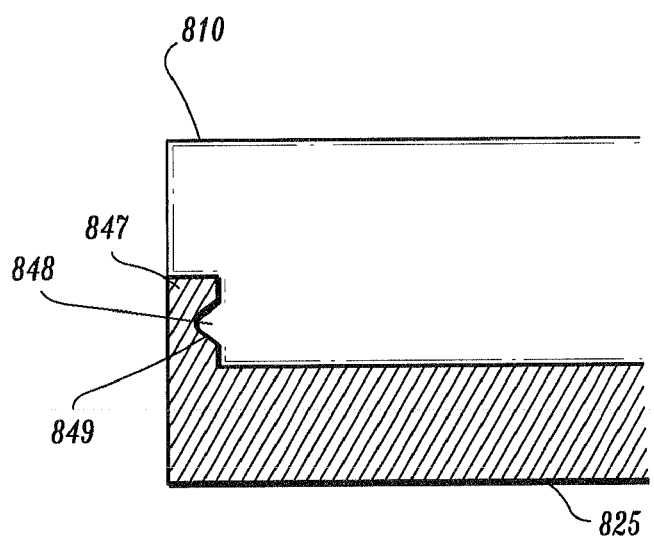

Referring to FIG. 12A, the docking station 825 may include a quick release mechanism for securing and releasing the base portion 810. The quick release mechanism can include a button 842 for releasing a latch 844, which is secured to the base portion 810 by pressing the base portion 810 securely into the docking station 825. The latch 844 passes into a bottom portion of the base portion 810. The latch 844 is momentarily displaced as the base portion 810 is coupled with the docking station 825. A spring 846 secures the latch 844 in the bottom portion of the base portion 810. The button 842 can be pressed to align the latch 844 with an opening in the bottom portion of the base portion 810, and the video system can be pulled away from the docking station 825. As shown in FIG. 12B, the base portion 810 can be secured by a convex portion 848 on the base portion 810 that fits within a concave portion 849 in the docking station 825. As the video system is pressed into the docking station 825, a wall of the docking station 847 flexes away from the base portion 810 until the convex portion 848 is aligned with the concave portion 849. The convex portion 848 and the concave portion 849 cooperate to secure the video system to the docking station 825. Thus, a wall of the docking station 847 can be formed of, for example, a flexible thermoplastic rubber. Other means of securing the video system to the docking station 825 are contemplated, such as, snaps, locks, latches, and the like.

Specifications for the displays 220-820 may include a TFD color liquid crystal display with a diagonal length of 4-8 inches, preferably 5.8 or 7 inches, and a full color TFT active matrix display. The dimensions of the video systems to be fixed to the hoods 200-700, including the display frame or base portion, may be approximately 150-250 mm wide, 125-175 mm long and 30-60 mm thick. The docking station 825 should be sized to house and secure the base portions of the video systems.

One of ordinary skill in the art can readily appreciate that the hood with the video system or docking station can be placed over any portion of the interior of a vehicle having a shape similar to that of a seat headrest.

In sum, a video system can be integrated into a hood that fits over vehicle seat headrest. The hood is removable and can be transferred between vehicles.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A video system comprising:
   a hood sized for fitting over a vehicle seat headrest, wherein the hood includes a display connectable to a media player, wherein the media player is located in the hood behind the display, and wherein the hood includes an opening through which the vehicle seat headrest is inserted into the hood, and the size of the opening is reduced to secure the hood to the headrest;
   a base portion attached to the hood; and
   a door pivotally attached to the base portion, wherein the display and the media player are mounted to the door, the display being mounted on an outside surface of the door, and the media player being mounted on an inside surface of the door opposite the outside surface, wherein the door is pivoted to an open position to provide access to a data media loading point on the media player and pivoted to a closed position to allow a user to view a video program on the display, wherein controls for controlling functions of the media player are positioned on the door and accessible by the user when the door is in the closed position.

2. The video system of claim 1, further comprising a frame for mounting the display, wherein the frame is attached to the hood.

3. The video system of claim 1, wherein the media player is one of a slot-type and a clamshell-type device.

4. The video system of claim 1, further comprising:
   a docking station attached to the hood, wherein the base portion is selectively coupled to the docking station, and wherein the base portion can be selectively decoupled from the docking station.

5. The video system of claim 1, further comprising a wireless transmitter.

6. The video system of claim 5, wherein the wireless transmitter includes one of an optical transmitting device and an antenna.

7. The video system of claim 5, wherein the wireless transmitter transmits wireless signals on more than one channel.

8. The video system of claim 1, further comprising a cover for covering the display.

9. The video system of claim 1, further comprising a port for connecting to an external device.

10. The video system of claim 1, further comprising at least one controller for controlling functions of the display.

11. The video system of claim 1, wherein the display is connected to a power source of the vehicle.

12. The video system of claim 1, wherein the hood includes a drawstring to reduce the size of the opening for tightening the hood to the vehicle seat headrest.

13. A video system comprising:
a hood sized for fitting over a vehicle seat headrest, wherein the hood includes a display and a media player located behind the display, and wherein the hood includes an opening through which the vehicle seat headrest is inserted into the hood, and the size of the opening is reduced to secure the hood to the headrest;
a base portion attached to the hood; and
a door pivotally attached to the base portion, wherein the display is mounted to the door and the media player mounted to the door, the display being mounted on an outside surface of the door, and the media player being mounted on an inside surface of the door opposite the outside surface, wherein the door is pivoted to an open position to provide access to a data media loading point on the media player, and pivoted to a closed position to allow a user to view a video program on the display, wherein controls for controlling functions of the media player are positioned on the door and accessible by the user when the door is in the closed position.

14. The video system of claim 13, wherein the media player is one of a slot-type and a clamshell-type device.

15. The video system of claim 13, further comprising a wireless transmitter.

16. The video system of claim 15, wherein the wireless transmitter includes one of an optical transmitting device and an antenna.

17. The video system of claim 15, wherein the wireless transmitter transmits wireless signals on more than one channel.

18. The video system of claim 13, further comprising a cover for covering the display.

19. The video system of claim 13, further comprising a port for connecting to an external device.

20. The video system of claim 13, further comprising at least one controller for controlling functions of the display.

21. The video system of claim 13, wherein the display and the media player are connected to a power source of the vehicle.

22. The video system of claim 13, further comprising at least one controller for controlling functions of the media player.

23. The video system of claim 13, wherein the hood includes a drawstring to reduce the size of the opening for tightening the hood to the vehicle seat headrest.

24. The video system of claim 13, wherein the display is coupled to the media player through an opening in the door.

25. The video system of claim 13, wherein the door pivots in a range of angles including approximately 0° to 180° with respect to the base portion.

26. A video system comprising:
a hood sized for fitting over a vehicle seat headrest, wherein the hood includes a display connectable to a media player, wherein the media player is located in the hood behind the display, and wherein the hood includes an opening through which the vehicle seat headrest is inserted into the hood, and the size of the opening is reduced to secure the hood to the headrest; and
a door pivotable with respect to the hood to open and closed positions, wherein the display and controls for controlling functions of the media player are positioned on an outside surface of the door and the media player is positioned on an inside surface of the door opposite the outside surface, wherein, when the door is in the closed position, the display faces a user to allow the user to view a video program on the display, and the controls are accessible by the user, and wherein, when the door is in the open position, a data media loading point on the media player is accessible by the user.

* * * * *